United States Patent
Sinyavskiy et al.

(10) Patent No.: US 11,099,575 B2
(45) Date of Patent: Aug. 24, 2021

(54) SYSTEMS AND METHODS FOR PRECISE NAVIGATION OF AUTONOMOUS DEVICES

(71) Applicant: Brain Corporation, San Diego, CA (US)

(72) Inventors: Oleg Sinyavskiy, San Diego, CA (US); Borja Ibarz Gabardos, La Jolla, CA (US); Jean-Baptiste Passot, Solana Beach, CA (US)

(73) Assignee: Brain Corporation, San Diego, CA (US)

( * ) Notice: Subject to any disclaimer, the term of this patent is extended or adjusted under 35 U.S.C. 154(b) by 105 days.

(21) Appl. No.: 16/260,590

(22) Filed: Jan. 29, 2019

(65) Prior Publication Data

US 2019/0235512 A1    Aug. 1, 2019

Related U.S. Application Data

(60) Provisional application No. 62/623,934, filed on Jan. 30, 2018.

(51) Int. Cl.
G05D 1/02 (2020.01)

(52) U.S. Cl.
CPC ......... *G05D 1/0217* (2013.01); *G05D 1/0238* (2013.01); *G05D 1/0274* (2013.01)

(58) Field of Classification Search
CPC ... G05D 1/0217; G05D 1/0274; G05D 1/0238
See application file for complete search history.

(56) References Cited

U.S. PATENT DOCUMENTS

| | | | | |
|---|---|---|---|---|
| 10,579,926 | B2* | 3/2020 | Yedidia | G06N 3/006 |
| 2015/0284010 | A1* | 10/2015 | Beardsley | G08G 1/22 701/41 |
| 2016/0096270 | A1* | 4/2016 | Ibarz Gabardos | B25J 9/161 700/253 |
| 2016/0299507 | A1* | 10/2016 | Shah | G01C 21/203 |
| 2018/0307941 | A1* | 10/2018 | Holz | G01C 21/20 |
| 2019/0219409 | A1* | 7/2019 | Tan | G01C 21/3461 |

* cited by examiner

*Primary Examiner* — Mary Cheung
(74) *Attorney, Agent, or Firm* — Reed Smith LLP; Sidharth Kapoor

(57) ABSTRACT

The safe operation and navigation of robots is an active research topic for many real-world applications, such as the automation of large industrial equipment. This technological field often requires heavy machines with arbitrary shapes to navigate very close to obstacles, a challenging and largely unsolved problem. To address this issue, a new planning architecture is developed that allows wheeled vehicles to navigate safely and without human supervision in cluttered environments. The inventive methods and systems disclosed herein belong to the Model Predictive Control (MPC) family of local planning algorithms. The technological features disclosed herein works in the space of two-dimensional (2D) occupancy grids and plans in motor command space using a black box forward model for state inference. Compared to the conventional methods and systems, the inventive methods and systems disclosed herein include several properties that make it scalable and applicable to a production environment. The inventive concepts disclosed herein are at least deterministic, computationally efficient, run in constant time and can be deployed in many common non-holonomic systems.

19 Claims, 6 Drawing Sheets

SYSTEMS AND METHODS FOR PRECISE NAVIGATION OF AUTONOMOUS DEVICES

PRIORITY

This application claims the benefit of priority to U.S. Provisional Patent Application Ser. No. 62/623,934 filed Jan. 30, 2018, the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNOLOGICAL FIELD

The present application generally relates to providing accurate route and/or environment mapping by providing computational efficiency performed by an autonomous device traveling along a path, which can reduce consumption of processing power, energy, and/or other resources in navigation.

BACKGROUND

In some cases, automated devices such as a robot map an environment. These maps enable the robot to navigate autonomously. As the robot maps its environment, it relies on its senses (e.g., using sensors) to detect features of the environment and remember those features for later reference. However, mapping can be a slow and difficult process due to, among other things, environmental noise, sensor noise and inaccuracy, significant processing time and great amount of memory usage in processing.

Inaccuracies in mapping can cause a robot to get lost during navigation or become unable to navigate an environment at all. In some cases, mapping issues can cause a robot to collide with objects or people in an environment or fail to accomplish the objective the robot was tasked to do. As a result, there is need in the art to develop systems and methods that can correct for inaccuracies in mapping, provide faster processing and use less memory space during processing of data analyzed by processor(s).

The process of selecting motor commands for precise navigation requires a lot of development in many real-world applications. For example, in industrial settings, the competing requirements of safety and performance make this process very challenging. A typical machine is a very heavy piece of equipment (e.g. industrial cleaning, factory delivery, forklift navigation); yet, it must navigate at a certain pace very close to obstacles in order to perform efficiently. Additionally, standard manual machines have complicated shapes (in contrast to circular platforms generally used to simplify motion control) and operate in cluttered and complex environments, such as grocery stores, malls, factories and warehouses, where they need to come extremely close to obstacles while preserving safe operation.

Because of these constraints, most existing methods for path planning cannot be used in this domain. For example, rough approximations of the robot's and environment's geometry, such as representing the robot as a set of simple geometric primitives will not work. For some of the conventional methods and systems, vehicle shape approximation is one of the big unsolved problems in autonomous driving.

SUMMARY OF EXAMPLE EMBODIMENTS

The foregoing needs are satisfied by the present disclosure, which provides for, inter alia, apparatus and methods for mapping in autonomous navigation. Example implementations described herein have innovative features, no single one of which is indispensable or solely responsible for their desirable attributes. Without limiting the scope of the claims, some of the advantageous features will now be summarized.

The example embodiments of inventive concepts disclosed herein focus on the task of path following by an autonomous device, such as a robot. Given a model of the robot, a state of the environment, a desired geometric path for robot to follow at every time step, a motor command is to be determined that minimizes certain externally given cost function. The inventive concepts comprises two phases or states: an offline state and an online state. During the offline state, a library of sequences of motor commands (motion primitives) is precomputed. Thereafter, the sequences of motor commands are simulated using a forward model of the robot to obtain a set of trajectories in the form of occupancy grids covered by the robot's footprint. During the online state, all trajectories for collisions are evaluated and it is determined as to how well they perform along a the path when following task. The trajectory corresponding to the best motion primitive is selected and the first motor command from this primitive is applied to the robot.

The inventive concepts disclosed herein decouple model and motion primitive generation from a planner development. A black-box forward model of the robot is used (for example, q physically realistic mathematical model or model learned from the data). As a result, this opens up opportunities for using the same planner for different platforms, like tricycles, differential drives or Ackermann steering, and trying out different motion primitives customized per environment (warehouse, grocery store etc.) or mode of operation (fast navigation vs small clearance navigation).

Generally, robots have complicated shapes with many protrusions (in contrast to circular platforms generally used to simplify motion control) and operate in cluttered and complex environments, such as, including but not limited to, grocery stores, malls, factories and warehouses. Because of these general constraints, a majority of existing methods for path planning cannot be used in this domain. For example, rough approximations of the robot's and environment's geometry, such as representing the robot as a set of simple geometric primitives, work poorly and require extended safety zones around obstacles to allow for approximation errors. The inventive concepts disclosed herein pertain to specialized algorithms which are configured to control motion for arbitrary environments and robot geometries, including non-convex robot footprints. The inventive concepts disclosed herein use precise robot footprints during motor primitive simulations to obtain an occupancy grid mask per simulated trajectory. These masks are then used on the environment to avoid collisions with the required small clearance and precision.

According to the inventive concepts disclosed herein, it is desirable that the algorithms are deterministic to allow scalable regression testing on large datasets and simulations and easy debugging of real world situations. When a conventional randomized algorithm fails to find a solution in a given time for a specific motion planning case, the failure can be attributed to an unfortunate state of the pseudo-random number generator. Therefore, every case may require comprehensive testing on different pseudo-random number generator seeds. In contrast, the specialized algorithms disclosed herein deterministically select a motion primitive out of a predefined set. For example, understanding and testing failure cases by modifying the set of motion primitives may be conducted. Additionally, the specialized algorithms disclosed herein run in constant time, which is a unique advantage for safe motor command selection in heavy robots. According to example embodiments of the inventive concepts disclosed herein, a novel formulation of the motion primitive selection process as a tensor contraction operation allows the specialized algorithm to efficiently parallelize its execution.

According to at least one non-limiting exemplary embodiment, a robotic system is disclosed. The robotic system may comprise a non-transitory computer readable storage medium comprising a plurality of instructions embodied thereon and a specialized processor configured to execute the instructions to: determine a first motion of a robot based on a change in pose of a sensor, the change in pose of the sensor being determined based on an image discrepancy between at least two images captured by the sensor at separate times; determine a second motion of the robot based on data from at least one other sensor and odometry unit; and determine the pose of the sensor based on a motion discrepancy between the first motion and the second motion of the robot. The specialized processor of the robotic system may further be configured to capture a first image using the sensor at a first time and capturing a second image at a second time, the first image and the second image comprising at least in part pixels of at least one object; determine the image discrepancy by translating and rotating the second image such that the translated and rotated second image matches the first image; and determine the change in pose of the sensor based on the translations and rotations performed on the second image. The sensor being mounted on the robot in a fixed pose and configured to measure at least a depth parameter of objects within a visual scene and produce images encoded with the depth parameter. The specialized processor may further be configured to localize the robot based on the determined change in pose of the sensor corresponding to a change in pose of the robot, the change in pose of the sensor corresponding to the rotations and translations performed on the second image.

The inventive concepts disclosed are performed by features in specific and particular configuration that make non-abstract improvements to computer technology and functionality. Some of these improvements in computer technology and functionality include executing specialized algorithm by unique and specialized processor(s) that allow the processor to perform faster and more efficiently than conventional processor(s); and requires usage of less memory space as data is collected, analyzed and stored therein. Accordingly, the inventive concepts disclosed herein are an improvement over the conventional technology or prior art directed to maneuvering a robot along a trajectory that are prone to safety risks to itself, humans and objects around it. Lastly, structural components disclosed herein, such as, for example, various sensor units, navigation units, actuator units, communication units and user interface units, are oriented in a specific manner and configuration that is unique to the functioning and operation of the robotic device as it maneuvers along a path.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The disclosed aspects will hereinafter be described in conjunction with the appended drawings, provided to illustrate and not to limit the disclosed aspects, wherein like designations denote like elements.

DETAILED DESCRIPTION OF EXAMPLE EMBODIMENTS

Figure 1:
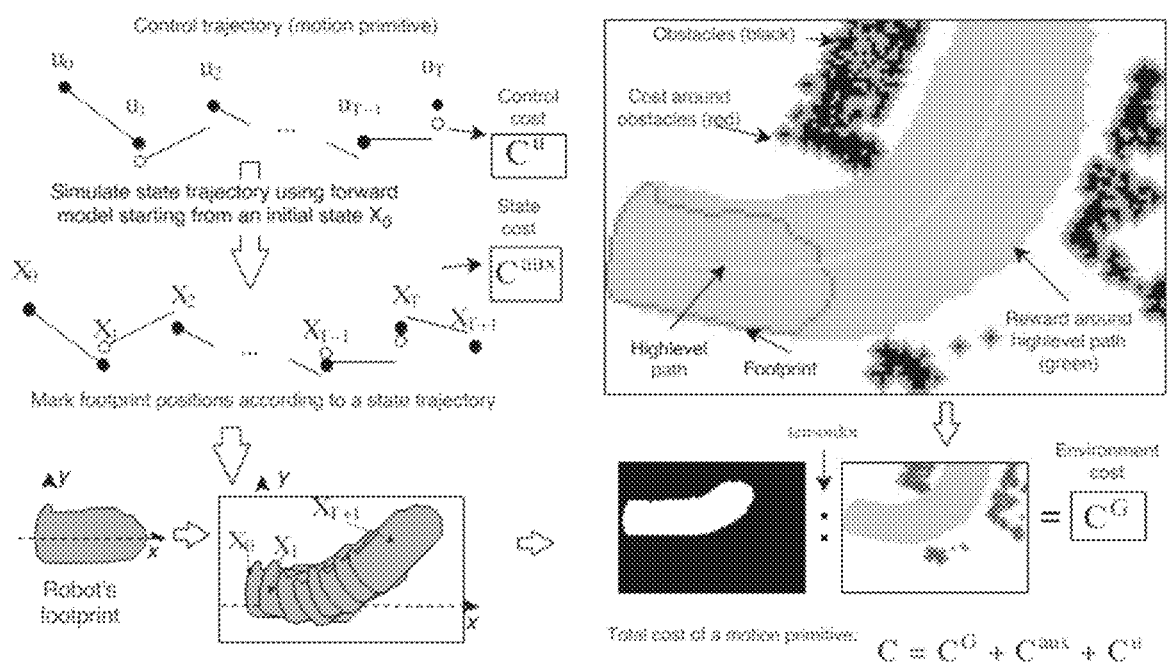
FIG. 1 illustrates computing the costs of a motion primitive according to example embodiments of disclosed inventive concepts.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for mapping of an environment by one or more automated devices. As used herein, automated devices, for example a robot, can include mechanical or virtual entities configured to carry out complex series of actions automatically. In some cases, automated device can be machines that are guided by computer programs or electronic circuitry. In some cases, automated device can include electro-mechanical components that are configured for navigation, where the automated device can move from one location to another. Such navigating automated devices can take various forms and shapes, such as including but not limited to autonomous cars, floor cleaners, rovers, drones, carts, and the like. As referred to herein, floor cleaners can include floor cleaners that are manually controlled (e.g., driven or remote control) and/or autonomous (e.g., using little to no user control). For example, floor cleaners can include floor scrubbers that a janitor, custodian, or other person operates and/or robotic floor scrubbers that autonomously navigate and/or clean an environment. Similarly, floor cleaners can also include vacuums, steamers, buffers, mop, polishers, sweepers, etc.

Detailed descriptions of the various implementations and variants of the system and methods of the disclosure are now provided. While many examples discussed herein are in the context of robotic floor cleaners, it will be appreciated that the described systems and methods contained herein can be used in other autonomous devices. Myriad other example implementations or uses for the technology described herein would be readily envisioned by those having ordinary skill in the art, given the contents of the present disclosure.

According to example embodiments of inventive concepts, a specialized algorithm is disclosed herein to (i) use real robot shape without approximations to be able to avoid obstacles with substantially minimum clearance, (ii) be applicable to common non-holonomic systems with different drive mechanisms, such as tricycle drive, differential drive or Ackermann steering and be deterministic with bounded run time to ensure robust real-time operation and scalable regression testing.

The specialized algorithm disclosed herein belongs to the class of Model Predictive Control (MPC) algorithms, where a forward simulation is performed and the initial control from the best simulation is applied in order to follow a path. Typical MPC optimization requires a simple analytic model of a vehicle. The specialized algorithm disclosed herein avoids explicit optimization in the control plan space during execution, and instead perform all possible optimizations offline to sample a large library of good motion primitives, from which the best one online is selected. This allows the example embodiments to use a forward model of arbitrary complexity.

According to example embodiments, methods are disclosed that are in close relevance to Dynamic Window Approach (DWA) algorithms that simulate trajectories for a discrete set of commands (usually, in the case of differential drive platforms, from a grid of achievable linear and angular velocities (v, ω)). The command that leads to the best non-colliding trajectory is then applied to the robot. These approaches are extended by using complex and diverse motion primitives that are simulated up to prediction horizon with a black-box forward model. This allows use of specialized algorithms for a diverse set of non-holonomic platforms with possibly intricate dynamics. Another difference with DWA planners is that the specialized algorithms disclosed herein use precise footprints and image-based collision detection, as mentioned above.

Randomized algorithms for non-holonomic systems based on Rapidly-exploring Random Trees (RRT) address the coverage problem by randomly expanding the tree of state transitions and evaluating a simple cost function at every expansion. In addition, some RRT-based algorithms that do not require a steering function are explicitly parametrized by a black-box forward model, similarly to the example embodiments disclosed herein. According to example embodiments randomized trajectory generation may also be used to prepare a set of motion primitives offline, but the online routine only deterministically evaluates the best motion primitive. In addition, according to example embodiments precise robot shape may be used for collision detection that is prohibitively expensive to implement in RRT-based algorithms.

Precomputed motion primitive footprint masks were used in conventional methods for discrete lattice-based global path planning, but a subsequent lower-level algorithm was needed for path following. In contrast, according to example embodiments footprint masks is used for direct robot control without low-level controller and without discretizing state space.

According to example embodiments, motion primitives in a control space is sampled. It is typically hard to achieve expressiveness and good coverage of the state space samples with such samples. Therefore, many conventional methods resort to sampling directly in state space and then rely on a low-level trajectory following controller. However, since the specialized algorithms disclosed herein sample motion primitives offline, a lot of development time can be devoted to ensure good coverage without additional low-level planning.

Referring to FIG. 1, computing the costs of a single motion primitive is depicted. Given a motion primitive (a sequence of control commands) the specialized algorithm computes control costs Cu. Then given an initial state of the robot X0 and a forward model F, the specialized algorithm computes a state trajectory. The state trajectory allows the specialized algorithm to compute pose-independent state trajectory costs Caux and to mark a footprint trajectory mask on a canvas. Given obstacle positions and a high-level reference path, a grid costmap is created in egocentric coordinates. Obstacle pixels have a large cost, and pixels close to obstacles are marked with decaying costs as well. The area around reference path is marked with a reward (negative cost). The costmap is cropped and trajectory footprint mask to the same size and take TENSORDOT between them, effectively adding up the costs masked by the trajectory footprint. This gives the geometric state cost CG of the motion primitive. The total cost of the motion primitive is the sum of control, state and geometric costs.

According to example embodiments, if $X_t$, $u_t$ are the robot's state and control at time step t, $X_{t+1}$ is the next robot state, then a forward model F can be defined as:

$$X_{t+1} = F(X_t, u_t) \quad (1)$$

For example, the state $X_t$ for a differential drive robot consists of its geometric pose $(x, y, \theta)_t$ and linear and angular velocities $(v, \omega)_t$. In the case of a tricycle drive, it additionally includes angle and angular velocity $(\alpha, \dot{\alpha})_t$ of the front steering wheel. Control $u_t$ for a differential drive robot may be stated in terms of desired linear and angular velocities $(v^d, \omega^d)_t$. A tricycle drive robot can be controlled via desired angle and linear velocity of the front wheel $(v^d, a^d)_t$.

Notation "u0 . . . T" is used for a vector of size T, indexed from 0 to T−1. Given an initial state X0, forward model F and a sequence of motor commands u0 . . . T, robot's state trajectory X0 . . . T+1 can be computed. According to example embodiments, the robot follows a desired path: $D^{pos}=(x_d, y_d, \theta_d)0 \ldots T$ final starting from current time step t=0 till some distant future time T final, while avoiding obstacles represented by the set of obstacle positions O. According to example embodiments, there is a cost c associated with robot's state and control sequences computed via function C(X0 . . . T+1, u0 . . . T; Dpos, O). The motor command selection is defined as a generic MPC problem: find a control sequence (a local plan) that minimizes the cost of the resulting trajectory predicted by the forward model, then select the first motor command from this sequence and apply it to the robot, then repeat the process.

$$u(X_0) = \left[\operatorname*{argmin}_{u_{0,t}} C(X_{0,T+1}, u_{0,T}; D^{pos}, O)\right]_0 \quad (2)$$

$$\text{subject to } X_{t+1} = F(X_t, u_t)$$

where [ . . . ]0 operator takes the first element from the control sequence u0 . . . T. The state of the robot $X = X^{pos}$, $X^{aux}$ consists of two-dimensional geometric pose $X^{pos}=(x, y, \theta)$ and other auxiliary state variables $X^{aux}$. For example, $X^{aux}$ for tricycle drive robot consists of velocities of the robot and steering wheel angle and velocity $X^{aux}=(v, \omega, \alpha, \dot{\alpha})$. A cost function C may be represented as a sum of three terms:

$$C(X_{0,T+1}, u_{0,T}; D^{pos}, O) = \quad (3)$$
$$C^{pos}(X_{0,T+1}^{pos}; D^{pos}, O) + C^{aux}(X_{0,T+1}^{aux}) + C^u(u_0, T)$$

where Cpos is the geometric trajectory cost function that takes current desired path Dpos and obstacles O; Caux is the non-geometric state trajectory cost function; and Cu is the control cost function. Cpos encourages robot to follow the desired path and avoid obstacles. Caux depends on the non-geometric robot's state (everything except the pose) such as its velocity or steering angle. Simple functions are used for the non-geometric state (Caux) and control (Cu) costs that penalize large motor commands and enforce smooth behavior (e.g. penalizing large steering wheel angles and linear velocity changes). The geometric trajectory state cost function Cpos is the desirable for safe and efficient navigation, and is described below in detail.

The method includes the following: instead of explicit optimization in the space of control sequences, the specialized algorithm may sample this space with a finite set of N samples—motion primitives, and forward model F, to a sequence of geometric poses and auxiliary sets. The costs for each motion primitive are substantially fully computed. Additionally, certain geometric properties of the primitive are also precomputed that will allow efficient parallel computation of its poses cost $c^{pos}$. Then at runtime: $c^{pos}$ is computed, the cost c for each motion primitive is computed, the primitive with the smallest cost is selected, and the first control command from this primitive is executed.

For a motion primitive in a particular initial state $X_0$ may be compute a state sequence X0 . . . T+1 (see FIG. 1). The pose sequence Xpos and mark high-resolution real robot footprints on a binary image are extracted for all poses from this sequence (FIG. 1, left-bottom). By that procedure, a binary 2D motion primitive image (matrix) A is obtained, which stores the area that the robot covers during execution of the primitive.

The path following as a task of collecting positive rewards located on the desired path is defined while avoiding obstacles. A local environment costmap E is built, which is 2D image (matrix) that stores per-pixel costs. The obstacles O and a clearance area (3 cm) on E are marked with large costs, then a small (6 cm) cost decay is added around obstacles. A reference path Dpos by drawing the robot footprint on E at each desired is referenced.

Masking the costmap E by a single motion primitive image A gives us the pixels that the robot would cover if the primitive is executed. The sum of the costs of all masked pixels is the pose cost cpos of the motion primitive (FIG. 1, right-bottom). This operation is equivalent to tensor contraction (tensordot) between A and E (cpos=A:E).

| Algorithm 1 Precomputing motion primitives libraries |
|---|
| 1:    // For each library and initial state |
| 2:    for all $X^{init}, u_{0..T}^{0..K} \in (X^{init}, u_{0..T}^{0..K})_{0..M}$ do |
| 3:        $A_{0..K} \leftarrow$ allocate_trajectories_tensor |
| 4:        $c_{0..K}^{aux} \leftarrow$ allocate_cost_vector |
| 5:        $c_{0..K}^{u} \leftarrow$ allocate_cost_vector |
| 6:        // For each motion primitive in a library |
| 7:        for all $k \in 0..K$ do |
| 8:            $X_{0..T}^{temp} \leftarrow$ allocate_state_vector |
| 9:            $X_0^{temp} \leftarrow X^{init}$ |
| 10:           // Forward model roll out |
| 11:           for $t \in 0..T + 1$ do |
| 12:                $X_{t+1}^{temp} \leftarrow F(X_t^{temp}, u_t^k)$ |
| 13:           end for |
| 14:           // split geometric and non-geometric state |
| 15:           $X_{0..T+1}^{pos}, X_{0..T+1}^{aux} \leftarrow X_{0..T}^{temp}$ |
| 16:           for $t \in 0..T + 1$ do |
| 17:                mark_robot_pose $(A_k, X_t^{pos})$ |
| 18:           end for |
| 19:           $c_k^{aux} \leftarrow C^{aux}(X_{0..T+1}^{aux})$ |
| 20:           $c_k^{u} \leftarrow C^u(u_{0..T}^{k})$ |
| 21:        end for |
| 22:        $L_m \leftarrow (A_{0..K}, c_{0..K}^{aux}, c_{0..K}^{aux}, c_{0..K}^{u}, u_0^{0..K})$ |
| 23:    end for |

Figure 2:
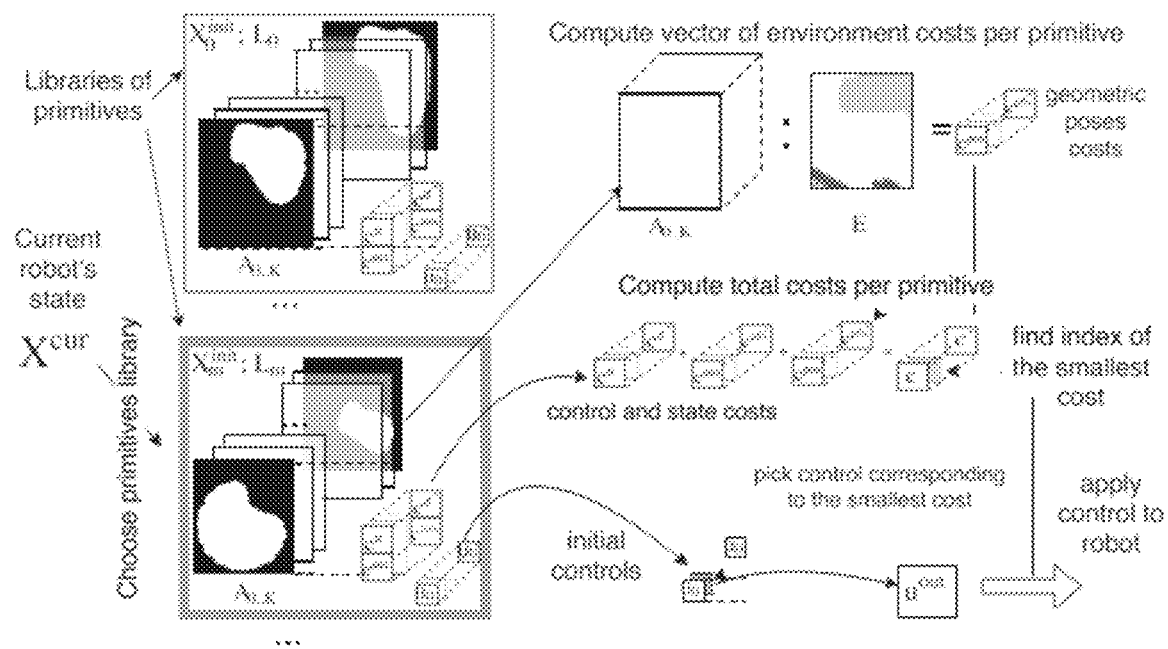
FIG. 2 illustrates specialized algorithms for online control command selection according to example embodiments of disclosed inventive concepts.

Referring to FIG. 2, algorithm for online control command selection. Given the robot's initial state X0, the corresponding library of motion primitive out of all precomputed primitives are chosen. The library includes a binary H W K tensor of K footprint trajectories marked on an image of height H and width W, together with K control and state costs and K first control commands u0, one for each motion primitive. (right-top) Performing efficient tensor contraction between selected footprint trajectories and current costmap, the length-K vector of geometric state trajectory costs Cpos of the primitives is obtained. Then the vector of total costs C as the sum of control CU is computed, auxiliary state Caux and geometric state Cpos costs. The initial control corresponding to the motion primitive with minimal cost is applied to the robot.

According to FIG. 2, an offline process (algorithm 1) of precomputing the libraries needed for fast online motor command selection. Having a set of K motion primitives u0 . . . K, the specialized algorithm generates a corresponding set of binary footprint trajectory images. The specialized algorithm pads them to the same shape W×H and stack them together to obtain a W×H×K tensor A0 . . . K (FIG. 2, left-top). Additionally, motion primitive is precomputed. For motion primitives library L, it is a collection of (i) tensor of foot print covered areas for each motion primitive; and (ii) vectors of non-geometric. Usually, the set of good motion primitives depends on the current state of the robot. Discretizing possible initial states X0 of the robot into M bins Xinit and generate a specific motion primitives library for each initial state $(X^{init}, u^{0 \cdots K})_{0 \ldots M}$. It is crucial that MPC planner works in an egocentric coordinate system. This removes 3 degrees of freedom from the set of initial states. Every initial state X0 has pose Xpos equal to (x, y, θ)=(0, 0, 0). This allows precomputed tensors to fit in conventional memory resources. Additionally, the specialized algorithm ignores some initial states to optimize memory usage. For example, for tricycle drive the specialized algorithm may use only the tricycle front wheel angle and linear velocities, and ignore the speed of rotation of the front wheel and the angular velocity. Precompute and store M motion primitives libraries $L_{0 \ldots M}$ for each initial state Xinit (FIG. 2).

The online portion of the algorithm uses the precomputed motion primitives libraries L. Given current robot's state Xcur, specialized algorithm may choose the closest initial state bin Xinit and corresponding motion primitives library L. From the library the specialized algorithm may obtain a tensor of trajectory images A0 . . . K. Then the specialized algorithm may build an egocentric 2D costmap E of the same width and height. To perform "planning" the specialized algorithm may do double tensor contraction (for example, see tensordot operation in popular tensor manipulation frameworks such as numpy or tensorflow). Notice that tensor contraction automatically takes care of collision detection since colliding primitives will have very high cumulative cost. At this point it is straightforward to include other costs such as control costs, smoothing etc. The primitive with the lowest total cost is chosen. If the lowest cost is above collision threshold (all trajectories lead to collision) the specialized algorithm may stop the robot. Otherwise, the specialized algorithm may take the first motor command from this primitive and apply it to the robot ($u^{out}$) (algorithm 2).

---

Algorithm 2 Online motor command selection

1: // Select library for the closest initial state

2: $m \leftarrow \arg\min_{m} \|X^{cur} - X_m^{init}\|$

3: $A_{0\ldots K}, c_{0\ldots K}^{aux}, c_{0\ldots K}^{u}, u_0^{0\ldots K} \leftarrow L_m$ 4: // Make costmap from obstacles and the desired path 5: $E \leftarrow \text{make\_costmap}(O, D^{pas})$ 6: $c_{0\ldots K}^{pos} \leftarrow \text{tensordot}(A_{0\ldots K}, E)$ 7: $c_{0\ldots K} = c_{0\ldots K}^{aux} + c_{0\ldots K}^{u} + c_{0\ldots K}^{pos}$

---

-continued

Algorithm 2 Online motor command selection

8: $k \leftarrow \arg\min_{k} c_k$

9: if $c_k$ < collision_threshold then

10: $u^{out} \leftarrow u_0^k$

11: else

12: $u^{out} \leftarrow$ stopping_command

13: end if

---

The specialized algorithm may be evaluated on a real robotic industrial tricycle cleaner RS26: weight with water is about 510 kg, footprint is non-convex with dimensions 1.6 m×1.4 m, distance between the axis of the back wheels and the center of the front tricycle wheel is 1 m. To tried to isolate evaluation of the local planner as much as possible from the rest of the system. The specialized algorithm disclosed herein receives a static path recorded from a human demonstration. This path does not change in the presence of obstacles. The specialized algorithm may use very short paths to minimize any noise from the localization system. While the robot has multiple sensors, the specialized algorithm may use only bottom planar range laser sensor and obstacles that can be easily detected by it without much noise. This is done to disentangle the effect of sensory processing from the performance of the planner. Range measurements and the static path to follow are projected on an egocentric coordinate system and are used to build an egocentric costmap. Motor commands generated by the algorithm (front wheel steering angle and linear velocity of the front wheel) are immediately sent to the low-level PID controllers at 20 Hz. The method is sensitive to the choice of motion primitives but the specialized algorithm may partially overcome this by creating a great number of possibly redundant primitives, since the specialized algorithm may be able to evaluate many of them efficiently. To create the library of primitives, the specialized algorithm may discretized front wheel angle position and initial linear velocity of the robot and obtained a set of possible initial states X0. Then for every initial state, the specialized algorithm may sample a great number of random motion control sequences of 2 s duration where controls are kept constant for 0.5 s-1 s. This procedure gives 2 to 4 constant control segments per primitive. Then, the specialized algorithm may run a parametric tricycle forward model fitted on a real robot data starting from the initial state through every motion primitive and obtained tensors of footprint images (examples are displayed in FIG. 2). A dataset of test cases of motion planning is built from the real-world experiments, running them in simulation and pruned unused primitives to obtain necessary real-time computational performance.

Figure 3:
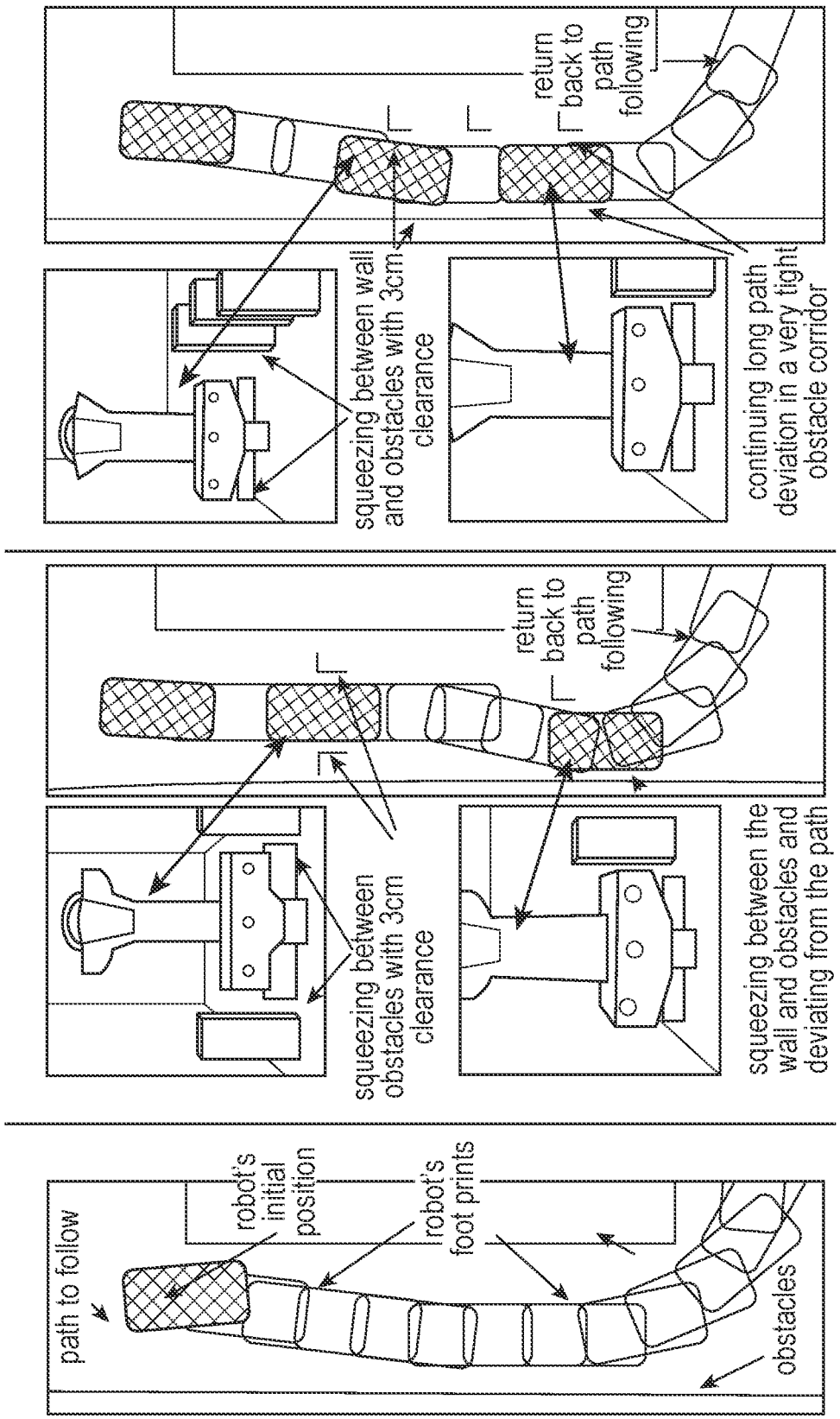
FIG. 3 illustrates a path followed by an automated device in a narrow or tight corridors according to example embodiments of disclosed inventive concepts.

With reference to FIG. 3, path followed in a narrow corridor is illustrated. The initial robot position is in bright green. Sequential robot footprint positions are in red. Obstacles rendered from laser observations are in black. The path for the planner to follow is in light grey. In dark green are the robot positions corresponding to screenshots, as shown in the left image. Path following without obstacles. The robot starts off the path, then turns to the path and follows it closely, as shown in the central image. Two obstacles are placed close to the path. The robot does not deviate from the path and squeezes through the opening with 3 cm clearance. The third obstacle causes the robot to deviate from the path and pass very close to the wall. After the deviation the robot returns to the path, as shown in the right image. Three obstacles are placed right on the path causing the robot to deviate from it for a longer time. After the deviation the robot returns to the path.

A path recorded from a human demonstration and a path following behavior is shown on FIG. 3. Here it may be demonstrated that the planner is able to follow a predefined path quite precisely and establish a baseline for its behavior when no obstacles are present. The robot starts 30 cm off the path and smoothly centers itself on the path. Next the specialized algorithm may test how the robot can squeeze between two obstacles that are not on the path FIG. 3 (center). Two obstacles are placed around the path. The robot passes them without deviating from the path. The specialized algorithm may place a third obstacle right on the path that causes the robot to deviate from the path and pass between the obstacle and the wall. In the next experiment three obstacles may be placed to form a very narrow passage off the path which the robot follows through FIG. 3 (right).

The algorithm automatically takes care of avoiding small obstacles without high-level replanning: an obstacle right on the path may be placed, and the robot was able to deviate from it to successfully avoid it. After the maneuvers the robot returns back to original path. This allows it to run smoothly without any stops for replanning. Also notice the very small clearance of 3 cm that the planner was configured to maintain.

Figure 4:
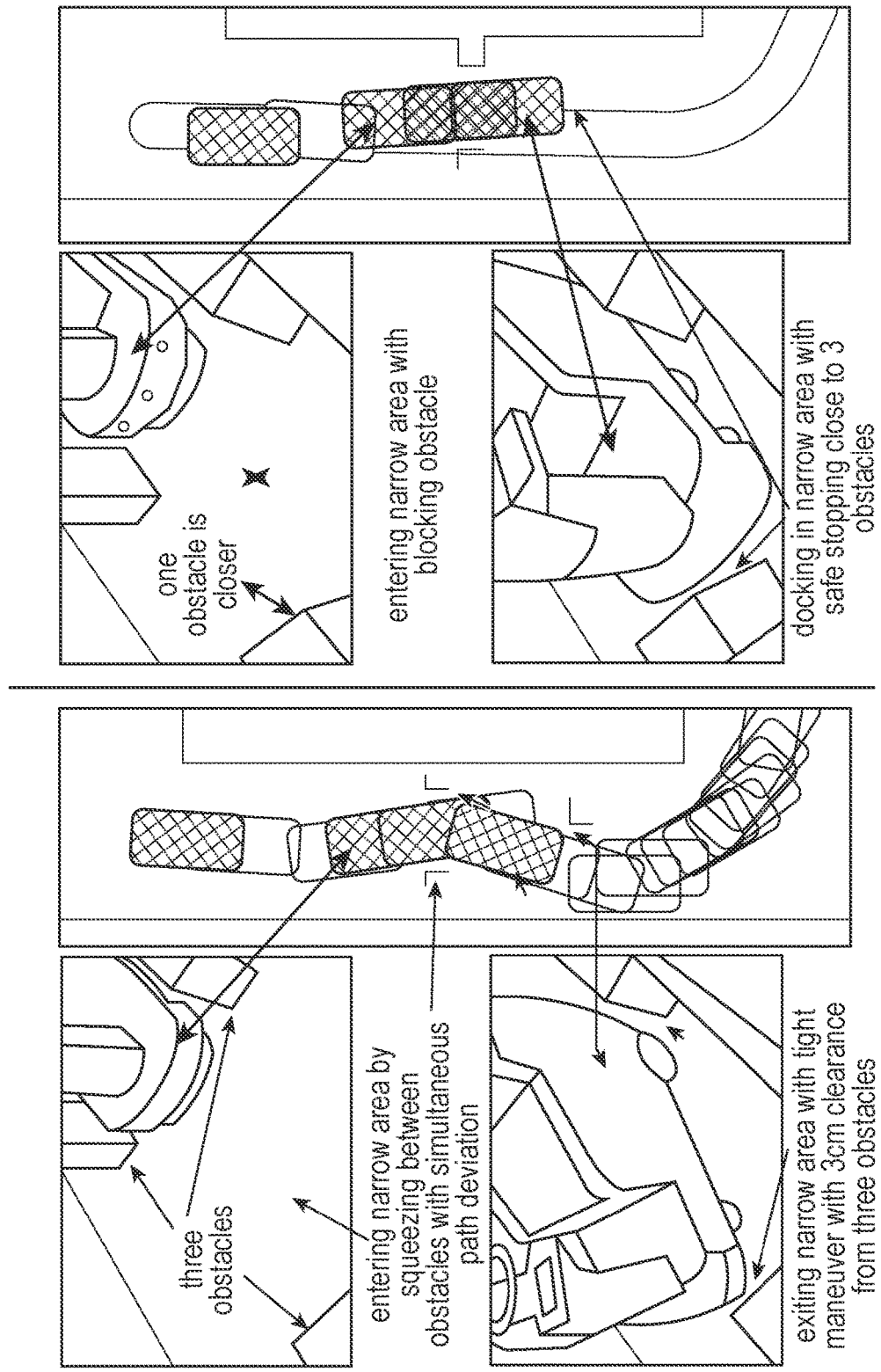
FIG. 4 illustrates a path followed by an automated device in a narrow or tight corridors according to example embodiments of disclosed inventive concepts.

Next, referring to FIG. 4, a path following in tight spaces is shown. The initial robot position is in bright green. Sequential robot footprint positions are in red. Obstacles rendered from laser observations are in black. The path for the planner to follow is in light grey. In dark green are the robot positions corresponding to screenshots, as shown in the left image. Three obstacles are placed to form a tight space of the size of the robot's footprint. The robot deviates from the path, enters the tight space and finds a safe and sharp maneuver to exit the tight space and continue path following. (right) The last obstacle is moved closer such that it is impossible for the robot to exit the tight space. The robot safely stops according to the 3 cm clearance, taking into account its stopping distance. In the next experiment (FIG. 4), tight maneuvering capabilities of the planner were explored, and present a few more cases of obstacle placement. First, three obstacles were placed to form a tight "box" approximately equal to the robot's size FIG. 4 (left). Notice that entrance to the "box" is off the path and the planner has to deviate from the path but still make it through a clearance of less than 10 cm. To return back to the path, the planner has to make a precise maneuver inside the tight space and "squeeze" between the obstacle and the wall. Also, notice that this is done on a speed close 0.4 m/s with a 400 kg non-circular robot.

Next, the last obstacle is moved closer to make the "box" shorter than the robot FIG. 4 (right). The planner takes a safe decision to stop the machine inside the tight space respecting the clearance. This demonstrates several additional important properties of the approach. First, the planner is able to automatically and safely slow down and stop the machine according to the stopping distance based on the trajectories evaluated using forward model. The length of the motion primitive trajectories is larger than the stopping distance, therefore always ensuring safety, provided that the forward model is precise enough. This effect is caused by gradual removal of the fastest trajectories from consideration when getting closer to frontal obstacles. After the slowest motion primitives are removed, the planner automatically stops the robot. Second, the planner is resilient to high-level planner failures such as failure to find a valid path in a short time frame, failures in localization that could make a path go through the wall, bad modeling assumptions or software errors. Notice that in most of the experiments the obstacles are placed right on the high-level path. This removes some pressure from the high-level planning system and uses less expensive high-level planning algorithms. Lastly, good docking (parking) behavior may be automatically achieved without additional algorithms.

Figure 5:
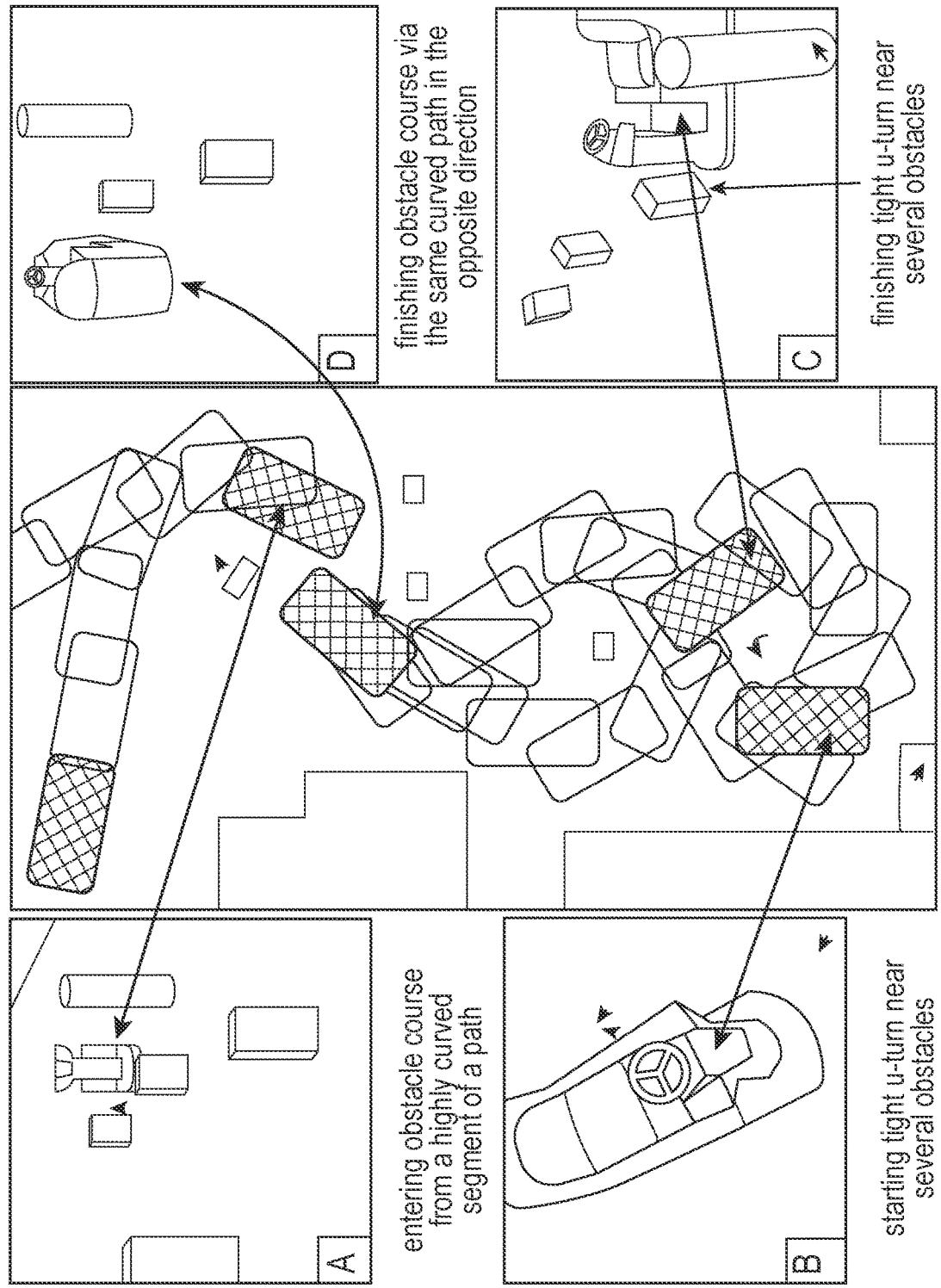
FIG. 5 illustrates a path followed by an automated device along a curved path according to example embodiments of disclosed inventive concepts

Referring to FIG. 5, path following of very curved paths on obstacle course is disclosed. The initial robot position is in bright green. Sequential robot footprint positions are marked by red (first half of the path) and green (second half of the path) contours. Obstacles rendered from laser observations are in black. The path for the planner to follow is in light grey. In dark green are robot positions corresponding to screenshots. The robot enters an obstacle course and performs sharp turns according to the desired path (screenshot A). Then the robot performs a u-turn around the obstacles at the bottom of the trajectory (screenshots B and C). The robot finishes the "FIG. 8" path and exits the obstacle course on the opposite direction (screenshot D).

In the last experiment, the ability of planner to follow curved routes and u-turns in the presence of obstacles is tested. In contrast to the almost-straight paths of the previous section, a challenging obstacle course path (FIG. 5) is recorded where every maneuver requires substantial awareness of the robot's shape and dynamics. Here, the ability of the planner to follow the path with tight obstacles in both directions and to perform several u-turns around the obstacles is disclosed.

The planning tensor contraction can be easily parallelized. Some implementations can take advantage of the fact that the motion primitive tensors are binary, therefore they can be phrased as a sum of cost pixels masked by footprint trajectories. Predicting the performance of tensordot (or masking with summation) is not a trivial task since different libraries and algorithms might use a diverse set of methods taking advantage of cache and GPU memory layout. It was experimentally shown that different implementations are faster in different situations, as such they were switched dynamically at runtime depending on the dimensions of the tensors and available computational resources. The implementations disclosed herein takes about 5 ms of total execution time of the local planner on a machine with multicore CPU and GPU.

An MPC-style method for motor command selection that selects the best motion primitive out of finite set of precomputed possibilities may be represented. Heavy use of precomputed trajectories allows the method to be efficiently parallelized on modern hardware. Being deterministic and running in constant predictable time gives it a strong advantage for product-level robotic development. The method is decoupled from the model of the robot and allows to use black-box forward models to control various robots with different kinematic drives. The method allows to use detailed robot footprints without any assumptions on the geometry of the robot and obstacles. The algorithm may be implemented on a tricycle-drive large industrial robot and achieved precise maneuvering in tight spaces with clearance of 3 cm from both sides of the robot. Another advantage of the algorithm is its robustness to failures of the high-level planning system: it automatically avoids obstacles placed right on the high-level plan and stops if there is no safe motor command available.

Figure 6A:
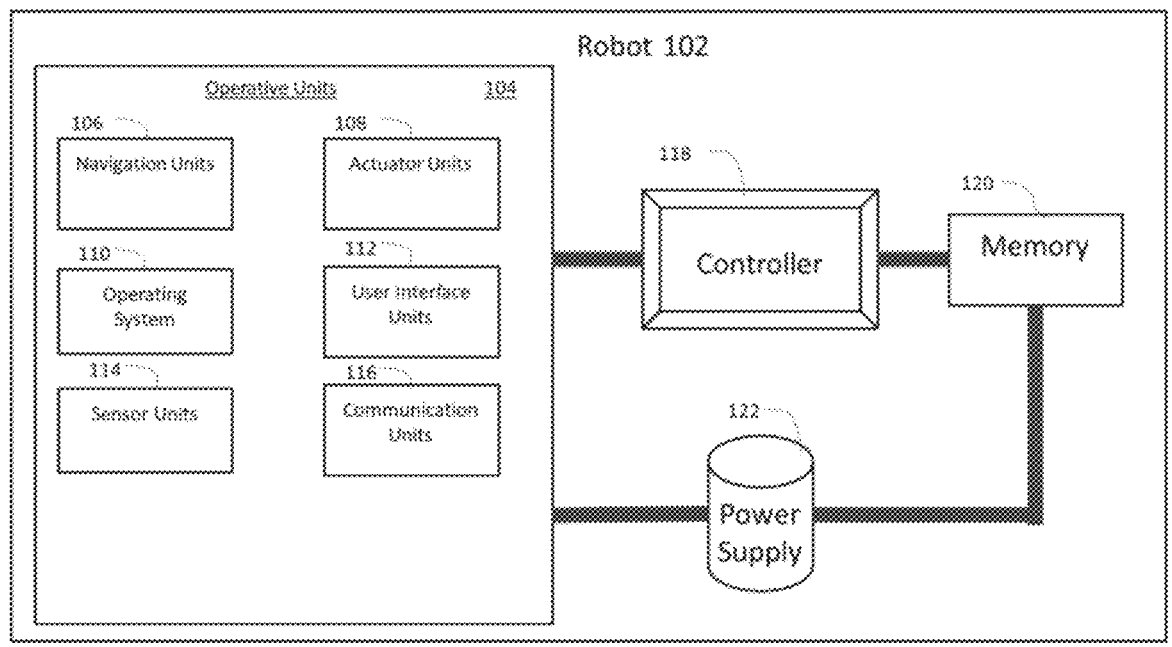
FIG. 6A is a functional block diagram of a main robot in accordance with some embodiments of this disclosure.

FIG. 6A is a functional block diagram of a robot 102 in accordance with some principles of this disclosure. As illustrated in FIG. 6A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 6A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 6A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events. It will be appreciated by one skilled in the art that memory 120 may include data table that may be a self-referential data table wherein additional rows and/or columns may be added as the controller 118 executes computer readable instructions.

Still referring to FIG. 6A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 6A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 6A, actuator units 108 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 6A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller executing computer readable instructions stored on a non-transitory computer readable storage apparatus, such as memory 120, as would be appreciated by one skilled in the art.

Figure 6B:
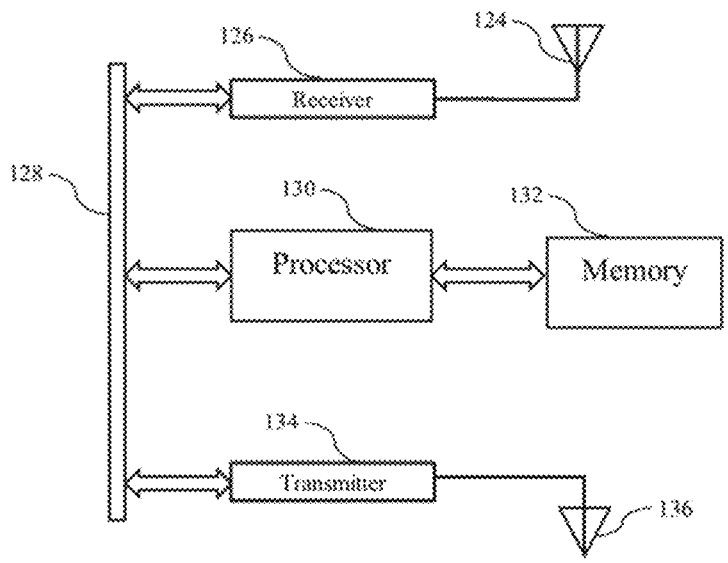
FIG. 6B is a functional block diagram of a controller or processor in accordance with some embodiments of this disclosure All Figures disclosed herein are © Copyright 2018 Brain Corporation. All rights reserved.

Next referring to FIG. 6B, the architecture of the specialized controller 118 used in the system shown in FIG. 6A is illustrated according to an exemplary embodiment. As illustrated in FIG. 6B, the specialized computer includes a data bus 128, a receiver 126, a transmitter 134, at least one processor 130, and a memory 132. The receiver 126, the processor 130 and the transmitter 134 all communicate with each other via the data bus 128. The processor 130 is a specialized processor configured to execute specialized algorithms. The processor 130 is configured to access the memory 132 which stores computer code or instructions in order for the processor 130 to execute the specialized algorithms. As illustrated in FIG. 6B, memory 132 may comprise some, none, different, or all of the features of memory 124 previously illustrated in FIG. 6A. The algorithms executed by the processor 130 are discussed in further detail below. The receiver 126 as shown in FIG. 6B is configured to receive input signals 124. The input signals 124 may comprise signals from a plurality of operative units 104 illustrated in FIG. 6A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processor 130 via the data bus 128. As one skilled in the art would appreciate, the data bus 128 is the means of communication between the different components-receiver, processor, and transmitter—in the specialized controller 118. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 6A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136.

One of ordinary skill in the art would appreciate that the architecture illustrated in FIG. 6B may illustrate an external server architecture configured to effectuate the control of a robotic apparatus from a remote location. That is, the server may also include a data bus, a receiver, a transmitter, a processor, and a memory that stores specialized computer readable instructions thereon.

There are several limitations of the approach that will be addressed in future work. The main limitation is the sensitivity of the planner to the choice of precomputed motion primitives. This sensitivity is partially alleviated by the ability of the method to evaluate a large number of motion primitives in parallel, so the developer can initially test many primitives and then converge on a sufficient set. Another limitation, common to many other planning techniques, is theoretical and practical non-optimality, and therefore susceptibility to local minima. Since the planning horizon is limited, the robot might get stuck in tight corners. In real world tests, this limitation may be addressed with the smarter high-level planning system, which was disabled in this work. Lastly, high memory requirements of the method may be required since it needs to store a lot of precomputed 2D images of footprint trajectories.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

Methods disclosed herein may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods in response to instructions stored electronically on a non-transitory electronic storage medium. The one or more processing devices may include one or more devices configured through hardware, firmware, and/or software to be specifically designed for execution of one or more of the operations of methods herein.

Further, while the server is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present invention can be realized in a variety of apparatus including electronic devices implemented using any combination of circuitry and software.

The processor(s) and/or controller(s) implemented and disclosed herein can comprise both computer-implemented instructions executed by a controller and hardcoded logic such that the processing is done faster and more efficiently. This in turn, results in faster decision making by processor and/or controller, thereby achieving the desired result more efficiently and quickly.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A system for causing a robot to navigate a space that includes obstacles, comprising:
   at least one processor; and
   a non-transitory computer readable media having executable instructions stored therein, which, when executed by at least one processor, cause the system to perform operations comprising:
   accessing obstacle positions, a reference path through the space, and a plurality of motion primitives, each motion primitive associated with one of a plurality of pre-computed costs and a pre-computed control command;
   generating a geometric trajectory cost of the robot based on the obstacle positions and the reference path;
   generating a non-geometric trajectory cost of the robot;
   selecting a single motion primitive from the plurality of motion primitives by minimizing a cost function based on the geometric trajectory cost, the non-geometric trajectory cost, and the pre-computed costs; and
   providing the pre-computed control command associated with the single motion primitive to at least one processor for instructing one or more drive mechanism to move the robot according to the pre-computed control command.

2. The system of claim 1, wherein accessing obstacle positions includes accessing a cost map of the space, further wherein minimizing the cost function includes applying, according to a state trajectory sequence, a trajectory footprint mask to a portion of the cost map having the same size and shape as the trajectory footprint mask, wherein the trajectory footprint mask has a shape and size defined by the precise shape and size of the robot relative to the obstacle positions and one or more obstacles are represented in the cost map as areas within the space having increased cost relative to areas within the space adjacent to the reference path.

3. The system of claim 1, further comprising generating the pre-computed costs offline, wherein the accessing, generating, generating, selecting, and providing steps are performed online.

4. The system of claim 3, wherein generating the pre-computed costs offline includes (i) generating the pre-computed costs while the robot is not navigating or (ii) generating the pre-computed costs while the robot is navigating using one or more of the at least one processor that is not performing the accessing, generating, generating, selecting, and providing steps.

5. The system of claim 1, further comprising generating the pre-computed costs according to a rapidly-exploring random tree algorithm that sums costs of a plurality of control commands of each of the plurality of motion primitives for a plurality of initial states or initial trajectories.

6. The system of claim 1, further comprising:
   generating a second geometric trajectory cost of the robot based on the obstacle positions and the reference path;
   generating a second non-geometric trajectory cost of the robot;
   selecting a second single motion primitive from the plurality of motion primitives by minimizing the cost function based on the second geometric trajectory cost, the second non-geometric trajectory cost, and the pre-computed costs; and
   when minimizing the cost function obtains a minimum cost that exceeds a threshold causing the robot controller to instruct the one or more drive mechanisms to stop the robot.

7. The system of claim 1, wherein accessing the plurality of motion primitives includes selecting, based on an initial state of the robot, the plurality of motion primitives from a library of motion primitives.

8. A method for causing a robot to navigate a space that includes obstacles, comprising:
- accessing obstacle positions, a reference path through the space, and a plurality of motion primitives, each motion primitive is associated with a pre-computed cost of executing a pre-computed control command;
- generating a geometric trajectory cost of the robot based on the obstacle positions and the reference path;
- generating a non-geometric trajectory cost of the robot;
- selecting a single motion primitive from the plurality of motion primitives by minimizing a cost function based on the geometric trajectory cost, the non-geometric trajectory cost, and the pre-computed cost; and
- providing the pre-computed control command associated with the single motion primitive to a controller configured for instructing one or more drive mechanism to move the robot according to the pre-computed control command.

9. The method of claim 8, wherein,
the accessing of obstacle positions comprises accessing a cost map of the space,
the minimizing the cost function comprises applying, according to a state trajectory sequence, a trajectory footprint mask to a portion of the cost map having the same size and shape as the trajectory footprint mask, the trajectory footprint mask comprises a shape and size defined by the precise shape and size of the robot in relation to the obstacle positions and one or more obstacles are represented in the cost map as areas within the space having increased cost relative to areas within the space adjacent to the reference path.

10. The method of claim 8, further comprising generating the pre-computed cost according to a rapidly-exploring random tree algorithm that sums costs of a plurality of control commands of each of the plurality of motion primitives for a plurality of initial states or initial trajectories.

11. The method of claim 8, wherein accessing the plurality of motion primitives includes selecting, based on an initial state of the robot, the plurality of motion primitives from a library of motion primitives.

12. The method of claim 8, further comprising generating the pre-computed cost offline, wherein the accessing, generating, generating, selecting, and providing steps are performed online.

13. The method of claim 12, wherein the generating the pre-computed cost offline includes (i) generating the pre-computed cost while the robot is not navigating or (ii) generating the pre-computed cost while the robot is navigating using one or more of at least one processor that is not performing the accessing, generating, generating, selecting, and providing steps.

14. A non-transitory computer readable media having executable instructions stored therein, which, when executed by at least one processor coupled to a robot, cause the at least one processor to:
- access obstacle positions, a reference path through a space, and a plurality of motion primitives, each motion primitive is associated with a pre-computed cost of executing a pre-computed control command;
- generate a geometric trajectory cost of the robot based on the obstacle positions and the reference path;
- generate a non-geometric trajectory cost of the robot;
- select a single motion primitive from the plurality of motion primitives by minimizing a cost function based on the geometric trajectory cost, the non-geometric trajectory cost, and the pre-computed cost; and
- provide the pre-computed control command to the at least one processor for instructing one or more drive mechanism of the robot to move the robot according to the pre-computed control command.

15. The non-transitory computer readable media of claim 14, wherein accessing obstacle positions includes accessing, by the at least one processor executing the instructions, a cost map of the space, further wherein minimizing the cost function includes applying, according to a state trajectory sequence, a trajectory footprint mask to a portion of the cost map having the same size and shape as the trajectory footprint mask, wherein the trajectory footprint mask has a shape and size defined by the precise shape and size of the robot relative to the obstacle positions and one or more obstacles are represented in the cost map as areas within the space having increased cost relative to areas within the space adjacent to the reference path.

16. The non-transitory computer readable media of claim 14, further comprising instructions which cause the at least one processor to generate pre-computed cost according to a rapidly-exploring random tree algorithm that sums costs of a plurality of control commands of each of the plurality of motion primitives for a plurality of initial states or initial trajectories.

17. The non-transitory computer readable media of claim 14, wherein accessing the plurality of motion primitives includes the at least one processor executing the instructions to select, based on an initial state of the robot, the plurality of motion primitives from a library of motion primitives.

18. The non-transitory computer readable media of claim 14, further comprising instructions which cause the at least one processor to generate the pre-computed cost offline, wherein the accessing, generating, generating, selecting, and providing steps are performed online.

19. The non-transitory computer readable media of claim 18, wherein generating the pre-computed cost offline includes (i) generating pre-computed cost while the robot is not navigating or (ii) generating pre-computed cost while the robot is navigating using one or more of the at least one processor that is not performing the accessing, generating, generating, selecting, and providing steps.

* * * * *